July 15, 1930. H. J. EARL 1,770,768
FENDER BRACE AND LAMP SUPPORT
Filed July 23, 1928

Inventor
Harley J. Earl

By Blackmore, Spencer & Hink
Attorneys

Patented July 15, 1930

1,770,768

UNITED STATES PATENT OFFICE

HARLEY J. EARL, OF DETROIT, MICHIGAN, ASSIGNOR TO GENERAL MOTORS CORPORATION, OF DETROIT, MICHIGAN, A CORPORATION OF DELAWARE

FENDER BRACE AND LAMP SUPPORT

Application filed July 23, 1928. Serial No. 294,696.

This invention relates to a fender and radiator brace combined with a lamp support and has particular application to use on automotive vehicles.

In prior constructions of automotive vehicles at the front portion thereof use has been made of the brace or rod which extends in front of the radiator from fender to fender. The lamps have also been mounted on this brace, but these constructions have not proved entirely satisfactory for the reason that the brace was in the way and obstructed the front of the vehicle.

It is the object of the present invention to utilize a brace which is out of the way and which at the same time will suitably brace both the fenders and the radiator and form a support for the head lamps.

The object of the invention is accomplished by placing a grille or other suitable lattice work at the front of the radiator and position the radiator core in the rear of this grille or lattice work. The fender brace extends from fender to fender through the radiator shell and between the grille and the core. The brace of the invention comprises two bracket portions attached to each fender and a central hollow or tubular portion which extends through the radiator shell and is rigidly connected at its ends to the bracket portion.

Figure 1:
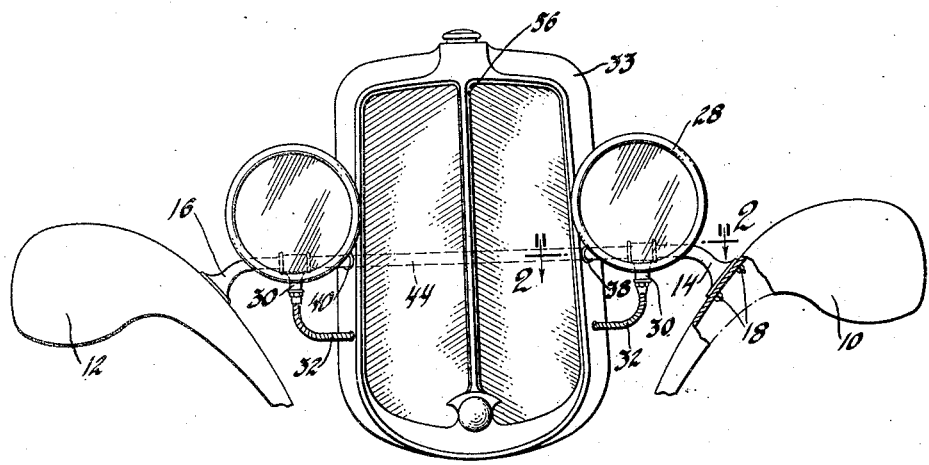
Fig. 1 shows a front view, with parts broken away, of so much of an automotive vehicle as is necessary to illustrate the invention.
Figure 2:
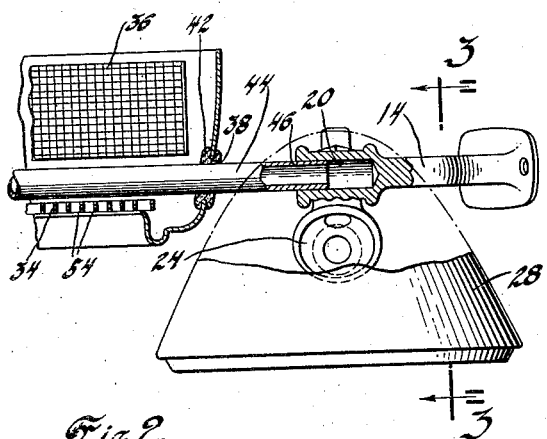
Fig. 2 is a section taken on the line 2—2 of Fig. 1.
Figure 3:
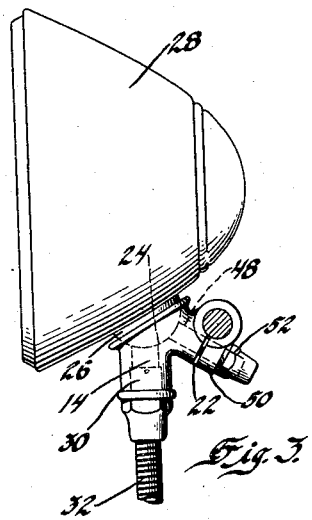
Fig. 3 is a sectional view taken on the line 3—3 of Fig. 2.

Referring to the drawing the numerals 10 and 12 indicate the fenders of an automotive vehicle and 14 and 16 designate suitable bracket portions attached to the fenders by means of the bolts and nuts (or rivets) 18. Each bracket portion has the hollow inner end 20 which is split as shown at 22 in Fig. 3. Each bracket portion also comprises the spherically shaped seat 24 for the reception of the ball 26 of the head lamp 28. A suitable extension 30 is provided on each bracket, the purpose of this extension being to allow the electrical connections 32 to be lead to and from the lamp.

The numeral 33 indicates the radiator shell to the front of which there is secured the grille or lattice work 34 and in the rear of this grille the usual radiator core 36 is secured.

The radiator shell 32 is provided with openings 38 and 40 at its two sides and in each opening a suitable fabric or rubber grommet or connection 42 is secured. Passing through the connections 42 is a hollow rod or tube 44 the ends 46 of which are positioned within the hollow inner ends 20 of the brackets 14 and 16.

The ball 26 of the lamp 28 has a bolt portion 48 which extends through the ears 50 of the split portion 22. A nut 52 is secured to this bolt portion 48 and when tightened will rigidly clamp the open end 20 of the brackets 14 and 16 about the hollow rod 44 to rigidly hold the brackets and tube 44 together.

The grille 34 is for appearance only and while it is a part of the radiator construction it performs no cooling function on the water of the circulating system.

By the present invention it will be seen that the customary fender brace rod in front of the radiator has been moved to cause it to pass through the radiator shell and behind the radiator structure where it is out of the way and serves as an additional support for the radiator construction. The brace rod at the same time serves as a suitable means for mounting the lamp 28 in the manner described.

The grille work 34 preferably comprises a plurality of metallic straps or slats 54 extending diagonally downward from the center of the radiator. The radiator shell is provided with a central rib 56 and the ends of the slats 54 are attached at their ends in any suitable manner to this rib and to the outer part of the shell.

While the grille work or lattice work has been shown as slanting from center to the sides, it may extend horizontally or vertically or slant from the edge to the central rib 56; or a honeycomb structure may be used. Where a shutter is applied, no grille work is necessary.

I claim:

1. In a vehicle having fenders, a radiator and a radiator shell, a bracket secured to each fender, a hollow end on said brackets, and a brace rod secured at its ends in said hollow ends and extending in front of the radiator core and through the shell.

2. In a vehicle having fenders, a radiator and a radiator shell, a bracket secured to each fender, a hollow end on said brackets, a brace rod secured at its ends in said hollow ends and extending in front of the radiator core and through the shell, and a grille in said shell in front of said brace rod.

In testimony whereof I affix my signature.

HARLEY J. EARL.